US007446495B2

(12) United States Patent
Tse et al.

(10) Patent No.: US 7,446,495 B2
(45) Date of Patent: Nov. 4, 2008

(54) DRIVE CIRCUIT FOR A HAIR CLIPPER

(75) Inventors: Kwok Kuen Tse, Hong Kong (CN); En Hui Wang, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 477 days.

(21) Appl. No.: 11/376,168

(22) Filed: Mar. 16, 2006

(65) Prior Publication Data

US 2006/0207103 A1 Sep. 21, 2006

(30) Foreign Application Priority Data

Mar. 18, 2005 (CN) ........................ 2005 1 0067636

(51) Int. Cl.
*H02P 1/00* (2006.01)

(52) U.S. Cl. ........................... 318/504; 318/494; 30/45; 30/210

(58) Field of Classification Search ............ 318/400.01, 318/494, 504; 30/45, 201, 209–210
See application file for complete search history.

(56) References Cited

U.S. PATENT DOCUMENTS 3,872,587 A * 3/1975 Wellinger .................. 30/43.92
4,514,667 A * 4/1985 Sakmann et al. ....... 318/400.01
5,632,087 A * 5/1997 Motohashi et al. ......... 30/43.92
6,441,517 B1 * 8/2002 Brum et al. ................... 310/37
7,193,377 B2 * 3/2007 Fung ..................... 318/400.01

FOREIGN PATENT DOCUMENTS

| | | |
|---|---|---|
| GB | 1059612 | 2/1967 |
| GB | 1110584 | 4/1968 |
| GB | 1 338 644 | 11/1973 |

* cited by examiner

*Primary Examiner*—Bentsu Ro
*Assistant Examiner*—Thai Dinh
(74) *Attorney, Agent, or Firm*—Birch, Stewart, Kolasch & Birch, LLP

(57) ABSTRACT

A drive circuit for a hair clipper comprises an electric motor and a control circuit for operating the motor at a constant speed regardless of load conditions. The control circuit has detector means for sensing the supply voltage to the clipper and the clipper current, processor means for generating an error signal indicative of a change in supply voltage needed to maintain a constant motor speed and driver means responsive to the error signal for adjusting the supply voltage to the motor to maintain the speed constant.

7 Claims, 5 Drawing Sheets

(a)

(b)

DRIVE CIRCUIT FOR A HAIR CLIPPER

FIELD OF THE INVENTION

This invention relates to a drive circuit for a hair clipper and to a hair clipper equipped with such a drive circuit.

PRIOR ART

Known hair clippers usually comprise a fixed blade, a movable blade and a DC motor for reciprocating the movable blade relative to the fixed blade. If the supply voltage to the motor remains constant, the cutting speed of the hair clipper will decrease with an increase in load and this can cause damage to the hair and cause pain to a user. When the cutting speed slows, hair may be caught by the blades and pulled or torn.

AIM OF THE INVENTION

The present invention seeks to overcome this drawback.

SUMMARY OF THE INVENTION

According to a first aspect of the present invention, there is provided a drive circuit for a hair clipper comprising an electric motor and a control circuit for operating the motor at a constant speed regardless of load conditions, the control circuit comprising detector means for sensing the supply voltage to the clipper and the clipper current, processor means for generating an error signal indicative of a change in supply voltage needed to maintain a constant motor speed and driver means responsive to the error signal for adjusting the supply voltage to the clipper to drive the motor at said constant speed.

Preferably, an error amplifier is provided for amplifying the error signal generated by the processor prior to supplying the signal to the driver means.

Preferably, the control circuit is an analog circuit or a digital circuit.

Preferably, the supply voltage to the clipper is regulated in linear mode or pulse width modulated switching mode.

According to a second aspect of the invention, there is provided a hair clipper equipped with a drive circuit according to the first aspect of the invention.

BRIEF DESCRIPTION OF THE FIGURES

The invention will now be more particularly described, by way of example, with reference to the accompanying drawings, in which.

DETAILED DESCRIPTION OF THE PREFERRED EMBODIMENT

Figure 1:
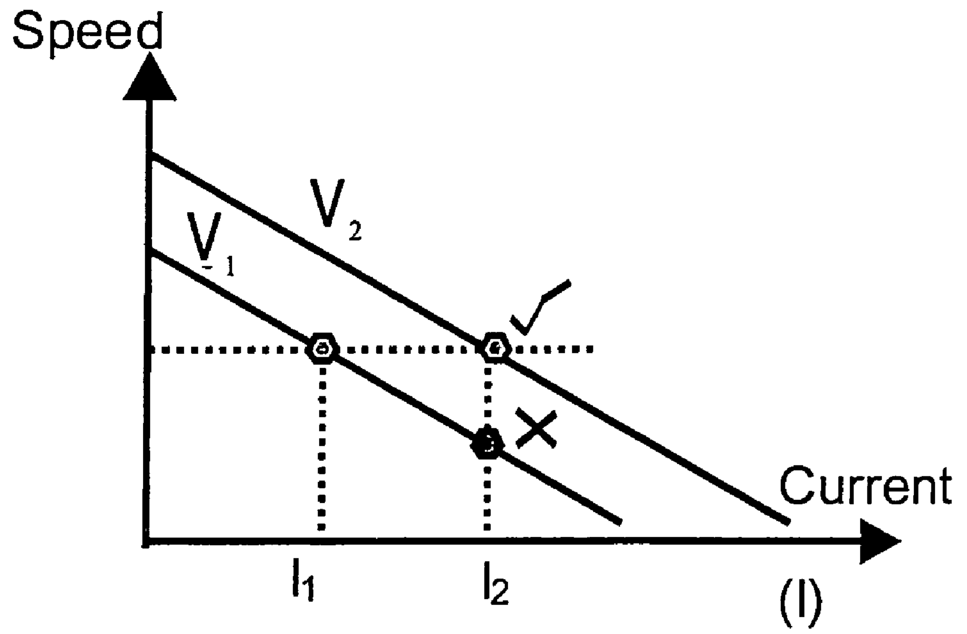
FIG. 1 is a graph demonstrating the characteristics of a known hair clipper.

Referring firstly to FIG. 1 of the drawings, the speed-current characteristic of a hair clipper shown therein demonstrates that for a constant supply voltage clipping speed will decrease with increase in load current. This of course happens as the clipper penetrates the hair of a user and also depends upon the quantity of lubricant applied to the moving blade of the clipper. As stated previously, a reduction in clipping speed can cause damage to the hair and can cause pain to a user.

Figure 2:
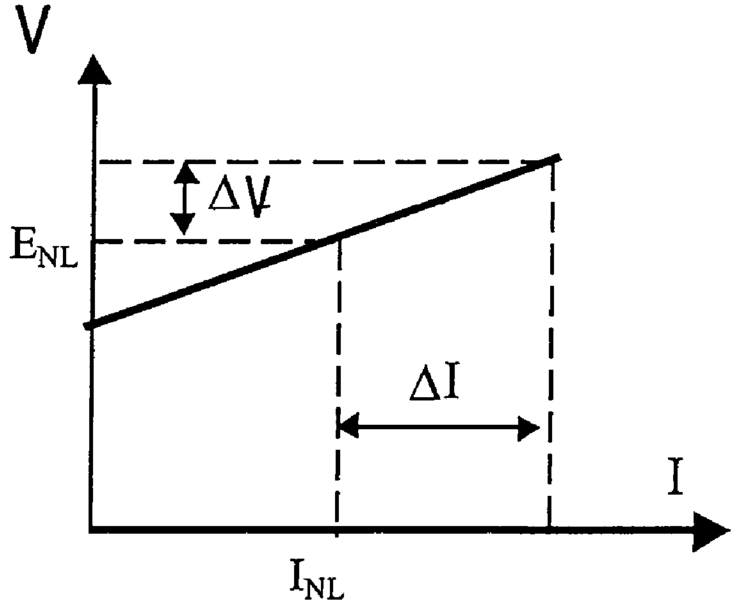
FIG. 2 is a graph demonstrating the relationship between a clipper's voltage and current at constant speed.

FIG. 2 demonstrates that it is possible to maintain a constant clipping speed by increasing the supply voltage to the clipper as the load on the clipper increases. Thus when the load current increases by ΔI as a result of a force applied to the clipper blades, the supply voltage to the clipper must be increased by ΔV in order to maintain a constant speed. It is to be noted that this has been found to be a linear relationship.

Figure 3:
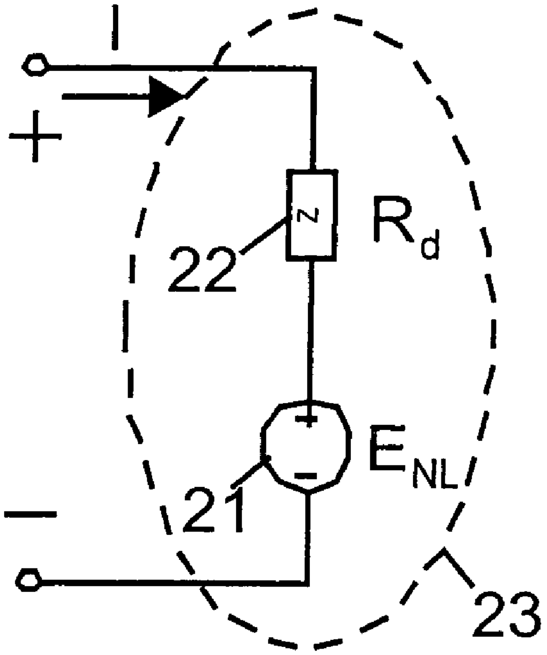
FIG. 3*a* is a schematic model of a clipper.
FIG. 3*b* is a schematic view showing a force applied to a moving blade of a hair clipper.
Figure 3:
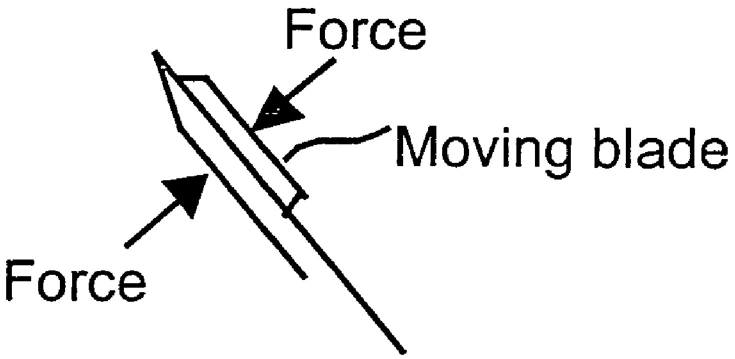

FIG. 3*a* is a schematic model of a clipper. The model is expressed by a voltage source 21 connected in series with a dynamic resistance 22. Therefore, the supply voltage to the clipper becomes:

$$V=E_{NL}+R_d(I-I_{NL}), \tag{1.1}$$

where

V=Supply voltage to clipper,

I=Clipper current, $I_{NL}$=No-load current to clipper $E_{NL}$=No-load voltage of clipper, $R_d$=Dynamic resistance of clipper.

A no-load condition applies when there is no hair present between the clipper blades and there is sufficient lubricant to operate the blades of the clipper.

Experimentally, $E_{NL}$ and $I_{NL}$ are simply measured at no-load condition at a predetermined clipping speed. As mentioned previously, if a force F is applied to the moving blade as shown in FIG. 3*b*, the clipper current increases by ΔI. However, the speed can be maintained by increasing the supply voltage to the clipper by ΔV.

By taking a partial differentiation of Equation (1.1) the dynamic resistance of the clipper can be expressed as:

$$R_d=\Delta V/\Delta I, \tag{1.2}$$

where

ΔV=Increase in V to maintain the clipper at no-load speed.

ΔI=Increase in I subject to F applied

Figure 4:
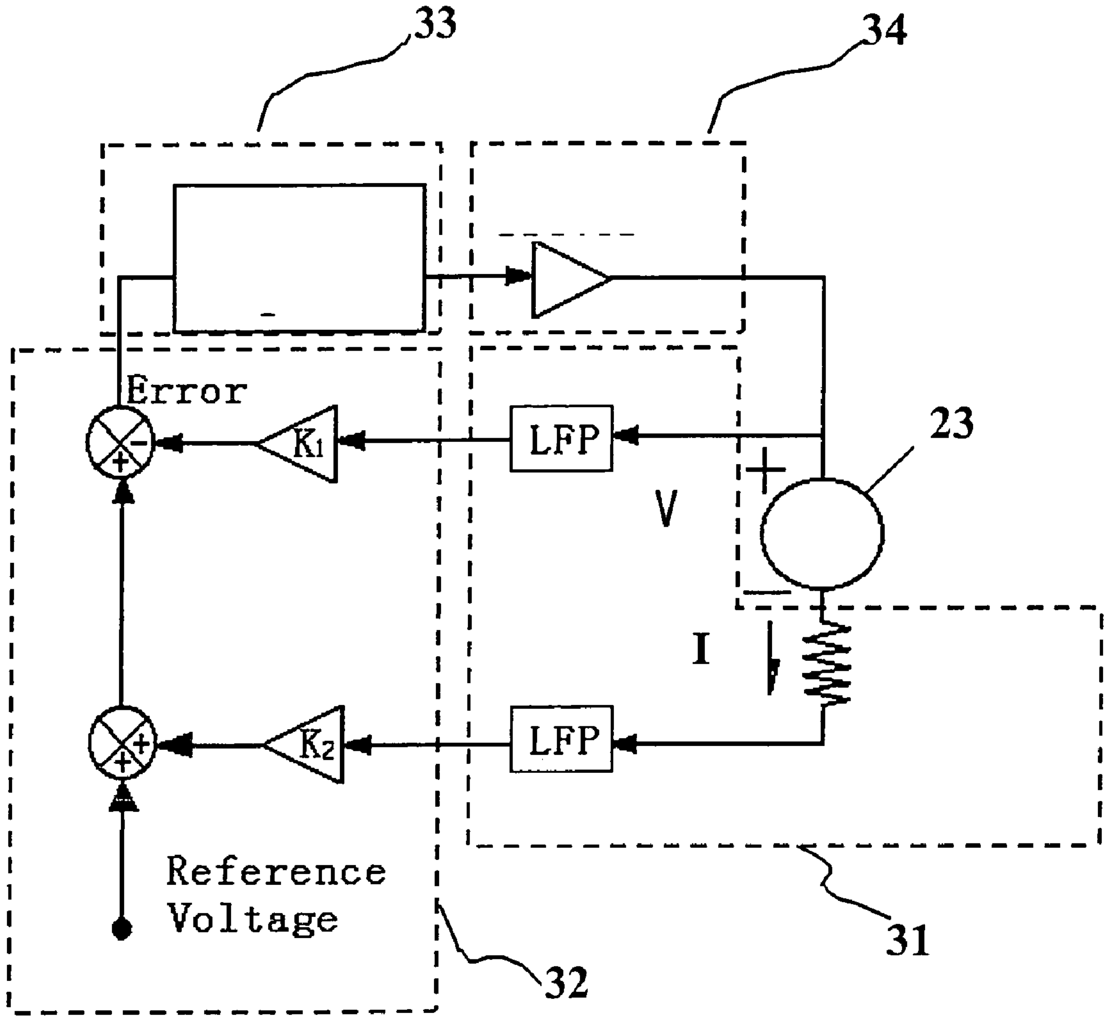
FIG. 4 is a schematic view of a drive circuit according to the first aspect of the present invention.

FIG. 4 shows a schematic view of a drive circuit for maintaining a constant motor speed regardless of load conditions.

A hair clipper is shown schematically by reference numeral 23. It comprises a fixed and a movable blade and a PMDC micromotor for reciprocating the movable blade relative to the fixed blade. The drive circuit for the clipper 23 comprises a signal detector 31 for sensing the supply voltage to the clipper and the clipper current, a processor 32 for generating an error signal, an error signal amplifier 33 and a motor driver 34. The error signal is representative of a change of supply voltage needed to maintain a constant motor speed.

The motor driver 34 is responsive to the error signal produced by the processor 32 and the error signal amplifier 33 and adjusts the supply voltage to the clipper to drive the clipper at a constant speed.

In the processor 32, the error signal is expressed by the following equation:

$$\text{Error}=V_{REF}+K_2I-K_1V \quad (2.1)$$

Where $V_{REF}$=Reference voltage defined by target speed, $K_1$=Voltage coefficient, $K_2$=Current coefficient, V=Controller's output voltage, I=Clipper current.

By continuously adjusting the motor driver 34, the processor 32 will make and keep the steady state of the error at zero. Therefore, Equation (2.1) can be written as follows $$V=\frac{1}{K_1}V_{REF}+\frac{K_2}{K_1}I \quad (2.2)$$

It is found that the controller's output V is proportional to $V_{REF}$ and I As compared with Equation (1.1), the parameters in Equation (2.2) are modelling the no-load clipper voltage and its dynamic resistance. That is, $$\frac{V_{REF}}{K_1}=E_{NL}-R_dI_{NL},\text{ and} \quad (2.3)$$

$$\frac{K_2}{K_1}=R_d. \quad (2.4)$$

It is a simple matter to obtain the parameters of $V_{REF}/K_1$, and $K_2/K_1$ experimentally.

Therefore, by executing Equation (2.2) in real time, the controller is sensing the current value of I and giving a corrective action to V so that the clipping speed can be maintained constant.

Figure 5:
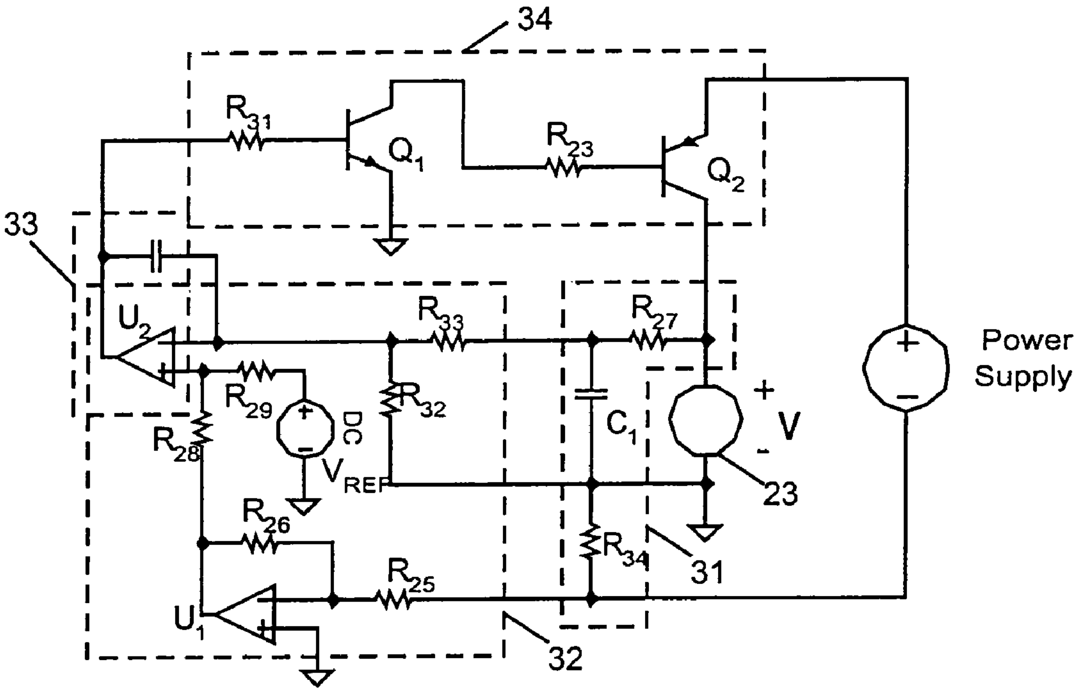
FIG. 5 is a circuit diagram of one specific embodiment of a drive circuit according to the first aspect of the present invention.

Referring now to FIG. 5, the clipper voltage V is controlled by a power transistor $Q_2$ working in linear mode. In this embodiment, the detector 31 comprises resistor $R_{27}$, capacitor $C_1$ and resistor $R_{34}$. The processor 32 comprises resistors $R_{25}$, $R_{26}$, $R_{32}$, $R_{33}$, $R_{28}$, and $R_{29}$ and opamp (operational amplifier) $U_1$. The error amplifier 33 comprises opamp $U_2$ and capacitor $C_2$. The motor driver 34 comprises resistors $R_{23}$ and $R_{31}$ and power transistors $Q_1$, and $Q_2$. This is an analog, low-cost circuit having no sophisticated ICs for process control and current sensing. There is also minimal EMI as the motor driver works in linear mode.

Figure 6:
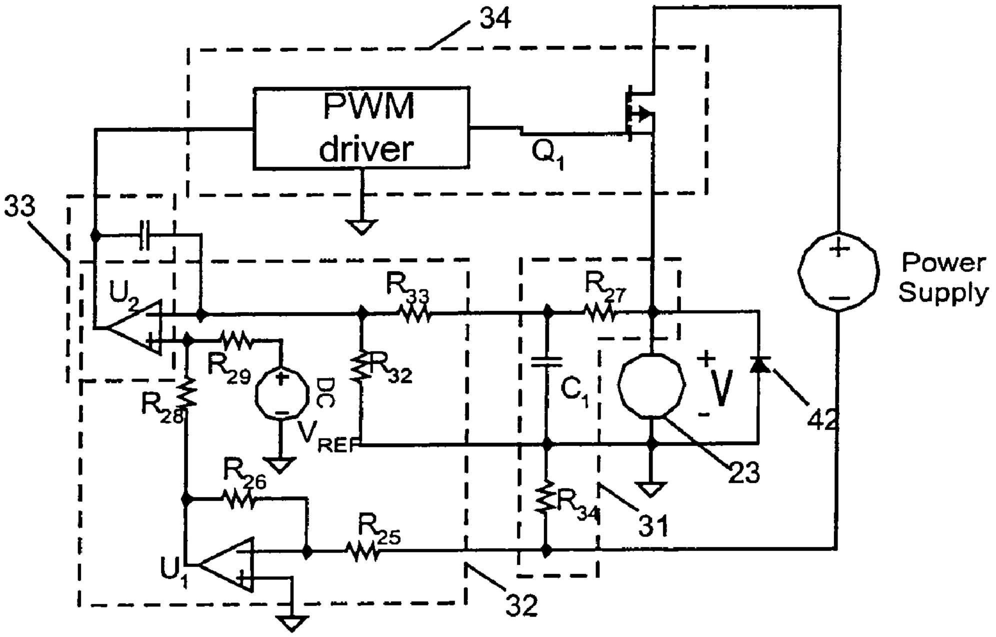
FIG. 6 is a circuit diagram of another specific embodiment of a drive circuit according to the first aspect of the present invention.

The circuit shown in FIG. 6 is similar to that shown in FIG. 5 except that the motor driver 34 operates in pulse width modulated (PWM) switching mode. Also, an anti-parallel diode 42 is provided across the clipper 23 to give a freewheeling path for the motor current.

For some high-end versions of the drive circuit, sophisticated features such as LCDs, tactile keypads, and battery-charger control will be provided. Thus, use of digital chips to realise the speed control becomes more versatile than the analog ones described with reference to FIGS. 5 and 6.

Figure 7:
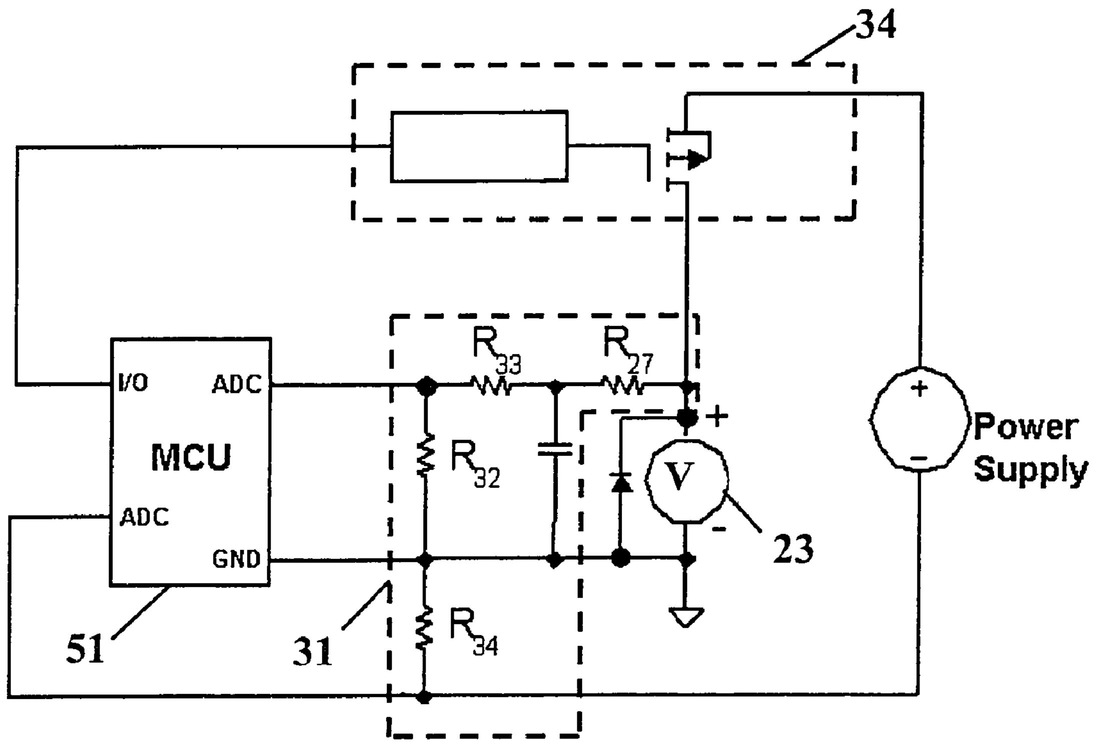
FIG. 7 is a circuit diagram of yet another specific embodiment of a drive circuit according to the first aspect of the present invention.

FIG. 7 shows a way of using a micro-controller unit (MCU) 51, which reads the clipper conditions from the detector 31 and executes Equation (2.2) to control the motor driver 34 operating in either linear or PWM switching mode.

It is therefore possible to provide a drive circuit for operating the clipper motor at constant speed regardless of load conditions. The drive circuit can be an analog or digital circuit and can regulate the clipper voltage in linear or PWM switching mode.

By maintaining a constant clipping speed regardless of load conditions, hair will not be damaged or squeezed by the moving blade. Users will therefore feel more comfortable during a hair cut. Secondly, the clipper can be designed to operate at a relatively low clipping speed to minimise acoustic noise. Thirdly, the quantity of lubricant applied to the clipper blades will not affect the clipping speed.

The embodiments described above are given by way of example only and various modifications will be apparent to persons skilled in the art without departing from the scope of the invention as defined by the appended claims.

The invention claimed is:

1. A drive circuit for a hair clipper comprising an electric motor and a control circuit for operating the motor at a constant speed regardless of load conditions, the control circuit comprising detector means for sensing the supply voltage to the clipper and the clipper current, processor means for generating an error signal indicative of a change in supply voltage needed to maintain a constant motor speed and driver means responsive to the error signal for adjusting the supply voltage to the clipper to drive the motor at said constant speed.

2. The drive circuit of claim 1, wherein an error amplifier is provided for amplifying the error signal generated by the processor prior to supplying the signal to the driver means.

3. The drive circuit of claim 1, wherein the control circuit is an analog circuit.

4. The drive circuit of claim 1, wherein the control circuit is a digital circuit.

5. The drive circuit of claim 1, designed to regulate the supply voltage to the clipper in linear mode.

6. The drive circuit of claim 1, wherein the control circuit is designed to regulate the supply voltage to the clipper in pulse width modulated (PWM) switching mode.

7. A hair clipper equipped with the drive circuit of claim 1.

* * * * *